United States Patent
Parlantzas et al.

(10) Patent No.: US 8,311,675 B2
(45) Date of Patent: Nov. 13, 2012

(54) METHOD OF CONTROLLING AN AUTONOMOUS DEVICE

(75) Inventors: Georgios Parlantzas, Aachen (DE); Jens Friedemann Marschner, Wuerselen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 729 days.

(21) Appl. No.: 12/518,918

(22) PCT Filed: Dec. 12, 2007

(86) PCT No.: PCT/IB2007/055052
§ 371 (c)(1),
(2), (4) Date: Jun. 12, 2009

(87) PCT Pub. No.: WO2008/075257
PCT Pub. Date: Jun. 26, 2008

(65) Prior Publication Data
US 2010/0030379 A1 Feb. 4, 2010

(30) Foreign Application Priority Data
Dec. 19, 2006 (EP) .................................. 06126544

(51) Int. Cl.
*G05B 19/04* (2006.01)
(52) U.S. Cl. .......... 700/253; 700/13; 700/204; 700/248; 700/258; 700/259
(58) Field of Classification Search ............. 700/13, 700/204, 253, 248, 258, 259; 901/8, 46, 901/47
See application file for complete search history.

(56) References Cited

U.S. PATENT DOCUMENTS

| | | | | |
|---|---|---|---|---|
| 4,627,511 A | * | 12/1986 | Yajima | 180/167 |
| 7,912,222 B2 | * | 3/2011 | Hagiwara | 380/270 |
| 2005/0064856 A1 | * | 3/2005 | Atkin et al. | 455/418 |
| 2005/0192038 A1 | * | 9/2005 | Jeong | 455/513 |
| 2005/0276418 A1 | * | 12/2005 | Hagiwara | 380/270 |
| 2006/0174130 A1 | * | 8/2006 | Noble | 713/182 |
| 2007/0263828 A1 | * | 11/2007 | Lee et al. | 379/212.01 |
| 2007/0274277 A1 | * | 11/2007 | Koizumi et al. | 370/338 |
| 2008/0094215 A1 | * | 4/2008 | Amador et al. | 340/572.1 |
| 2009/0235570 A1 | * | 9/2009 | Sammut et al. | 42/122 |

FOREIGN PATENT DOCUMENTS
EP 0466492 A2 7/1991
(Continued)

*Primary Examiner* — Khoi Tran
*Assistant Examiner* — Jorge Peche

(57) ABSTRACT

The invention describes a method of controlling an autonomous device (1), which autonomous device records ambient data and optionally transmits the recorded ambient data, which method comprises positioning an indicator ($S_1, S_2, S_3, S_4$) at a boundary (B) between a private area (P) and a non-private area (N) to optically distinguish the private area (P) from the non-private area (N) for a user of the autonomous device (1). The indicator ($S_1, S_2, S_3, S_4$) is detected by the autonomous device (1) and interpreted to determine whether the autonomous device (1) is in a private area (P) or a non-private area (N). Subsequently, recording or transmission of ambient data is restricted while the autonomous device (1) is within the private area (P). The invention also describes a system ( ) for controlling an autonomous device (1), an autonomous device (1), and an indicator ($S_3, S_4$) for placement at a boundary between a private area (P) and a non-private area (N), to optically distinguish the private area (P) from the non-private area (N) for a user (2), comprising a number of electronically detectable components (23, 24).

12 Claims, 4 Drawing Sheets

FOREIGN PATENT DOCUMENTS

| | | |
|---|---|---|
| EP | 1331537 A1 | 7/2003 |
| EP | 1499148 A2 | 1/2005 |
| EP | 1613061 A1 | 1/2006 |
| GB | 2371907 A | 8/2002 |
| JP | 2005279830 A | 10/2005 |
| WO | 2005002263 A1 | 1/2005 |
| WO | 2007041295 A2 | 4/2007 |

* cited by examiner

METHOD OF CONTROLLING AN AUTONOMOUS DEVICE

FIELD OF THE INVENTION

The invention describes a method of controlling an autonomous device, and to a system for controlling an autonomous device. The invention also relates to an autonomous device and to an indicator for placement at a boundary between a private area and a non-private area.

BACKGROUND OF THE INVENTION

Developments in the field of dialogue systems for use in consumer households can be expected to lead to the widespread use of such dialogue systems in homes in the near future. A home dialogue system can be realized as a kind of 'robot', perhaps even with human or animal appearance or characteristics, and can be used to perform tasks for the user. Such tasks might be of a practical nature, such as cleaning a floor or tidying up, and can serve to assist a user in everyday situations. To increase the practical usefulness of a home dialogue system, such a device will be able to autonomously move about in its environment. It is likely that such an autonomous system, or autonomous device, will avail of a certain ability to 'learn' from its surroundings, and that it continuously collects or records audio and video data. For example, the autonomous device might continuously record video data which are then processed so that the autonomous device can determine if there are any items in its surroundings that need to be tidied away, or if it can 'see' an item that the user has sent it to fetch. Audio data can also be continuously recorded and analyzed so that the autonomous device can determine if it is being addressed and can 'understand' what is being said.

Such analysis and processing of audio and video data requires a certain amount of electronic hardware such as speech and image recognition systems, which can be bulky. On the other hand, incorporating such hardware into the autonomous device will make this relatively large and cumbersome, and correspondingly expensive. Therefore, since it is easy to transmit audio and video data over a wireless network to, say, a personal computer (PC) having sufficient processing power, it would suffice to simply record the data using cameras and microphones, and to transmit the data for distributed processing, perhaps in a compressed format, to the PC in the vicinity. The PC can then process the data and provide the autonomous device with any relevant results. The autonomous device can thus be realized in a more compact way, which is also an economic consideration, particularly when there are more than one autonomous device in use in a certain environment.

The continual recording of audio or video data might be undesirable to a user for a number of reasons. For example, it might well be unacceptable to have images or audio recordings of a user in a private situation being transferred to a potentially insecure medium where they are vulnerable. With relatively little effort, a person with ill intent can tap into and record any data being transferred over a wireless network, which is certainly undesirable from the user's point of view. Data can also be retrieved relatively easily from a hard disk, even after they have been deleted. However, even if private data recorded by the autonomous device is not misappropriated, merely the feeling of being continually 'watched' or 'observed' by the autonomous device can be uncomfortable to a user. This might apply even if the autonomous device is simply gathering video or audio data for the purpose of fulfilling its assigned tasks. Since it is foreseeable that many homes in the near future will be equipped with such autonomous devices, this problem will be experienced by a growing number of users. One way of dealing with this problem might be for the user to issue a spoken command to stop the autonomous device from transferring audiovisual data to a host computer. However, the user must be aware that the autonomous device has entered a private area, and the user must also remember to issue the appropriate command at a later time to allow the autonomous device to resume transmission. Besides, such commands might not always be practicable, for example if the user is in the shower, or asleep.

Therefore, it is an object of the invention to provide a straightforward way of ensuring the privacy of a user of an autonomous device.

SUMMARY OF THE INVENTION

To this end, the present invention describes a method of controlling an autonomous device that is capable of recording ambient data and optionally transmitting the recorded ambient data, which method comprises positioning an indicator at a boundary between a private area and a non-private area to optically distinguish the private area from the non-private area for a user of the autonomous device. The indicator is detected by the autonomous device and interpreted to determine whether the autonomous device is in a private area or a non-private area. Subsequently, recording or transmission of ambient data is restricted while the autonomous device is within the private area.

The autonomous device can collect and record data such as audio or video data pertaining to its surroundings, for example the rooms of a house, for transmission to an external device. The 'external device' can be any device external to the autonomous device which is capable of receiving the transmitted data. Such an external device can be located in the vicinity of the autonomous device, for example in the same residence, or may be located elsewhere, for example a central server as part of the internet. The autonomous device may transmit the data over a peer-to-peer network, over a wireless local area network (WLAN), or over any other suitable type of network. As already mentioned, the reason for doing this can be that an external device such as a PC might avail of more processing power for performing data analysis, for example for performing image analysis on video recordings collected by the autonomous device as it moves about the house, or for performing speech recognition on audio recordings made by the autonomous device.

A private area can be any area such as a single room in a residence, or a region in a room. Equally, the private area can be part of a residence such as an entire story. According to the invention, a user can designate as 'private', by means of an indicator, any such area in which he does not wish to have audio or video recordings to be made or transmitted to an external device. The indicator can be any type of sign or label that can be 'read' or otherwise visually understood by a person. The user simply places the indicator in a suitable location, for example on a wall, thereby automatically creating a demarcation between the private area and the non-private area. The indicator optically shows this demarcation. For example, the indicator might show an arrow, so that the area pointed at by the arrow is the private area. The non-private area would then, by default, be the area on the opposite side. The boundary between a private area and a non-private area can be a tangible and visible boundary, for instance when the indicator is placed on the jamb of a door-frame, but can equally well be a virtual demarcation, for example when the visual indicator is placed on a wall of a hallway or landing, so that the area on one side of the visual indicator is 'private', and the other side is 'not private', and these areas are separated by an imaginary vertical line through the indicator.

The demarcation between 'private' and 'non-private' given by the indicator can clearly be seen by any user. A user can tell, at a glance, on which side of the visual indicator the private area is, and on which side the non-private area is. In the following, therefore, the indicator is referred to as a 'visual indicator'. The user need not be in any doubt as to which area will be 'seen' by the autonomous device to be private as it passes the visual indicator. Once the autonomous device 'sees' the visual indicator and moves into the private area, it automatically restricts recording or transmission of ambient data until it once more leaves the private area. For example, if the autonomous device records image or video data while moving about a residence and continually transmits this data to a PC, the autonomous device can cease recording image or video data while in a room marked as a private area. However, since this might unduly hinder the autonomous device in carrying out a task, such as cleaning the room, it can continue to record image and video data for its own use, but refrain from transmitting the data to the external device.

An obvious advantage of the method according to the invention is that any area can be designated by the user as 'private', in an easy and intuitive manner. The user can be sure that as long as the autonomous device is within the private area, data of a potentially sensitive nature will not be transmitted by the autonomous device to an external device, where such data might otherwise fall into the wrong hands or be misappropriated. Such a demarcation into 'private' and 'not private' can be rescinded or cancelled at any time—all the user need do is remove the visual indicator or change its orientation. This means that the autonomous device does not have to be specifically programmed in advance to regard certain areas as private. Also, the autonomous device can continue to enter areas marked as private without being interrupted from carrying out any task to which it may have been assigned.

An appropriate system for controlling an autonomous device that records and optionally transmits ambient data comprises an indicator for positioning at a boundary between a private area and a non-private area to optically distinguish the private area from the non-private area for a user of the autonomous device, and a detector for detection of the indicator by the autonomous device. The system further comprises an interpretation unit for interpretation of the indicator by the autonomous device to determine whether the autonomous device is in a private area or a non-private area, and a control unit for restricting recording or transmission of ambient data while the autonomous device is within the private area.

An autonomous device for use in the method according to the invention preferably comprises a recording means for recording audio and/or video data and a transmitter for transmitting recorded data to a host. To detect a visual indicator, the autonomous device can comprise a dedicated detector. This may be an image analysis module for performing simple pattern recognition, for example to detect the known or predefined shape of a visual indicator, or an electronic detector, as will be explained in more detail below. The autonomous device according to the invention also comprises an interpretation unit for interpretation of the visual indicator to determine whether the autonomous device is in a private area or a non-private area, i.e. to determine on which side of the visual indicator is the private area. To restrict recording or transmission of recorded data to an external device, the autonomous device preferably also comprises a suitable transmission control unit, for example a switch to disable a transmitter, or a software command to inhibit transmission.

The dependent claims and the subsequent description disclose particularly advantageous embodiments and features of the invention.

When a user wishes to demarcate a private area from a non-private, or 'public' area, he can do this by simply placing a visual indicator at a boundary, whether real or imaginary, between the private and non-private areas. For example, he can affix a label to the door frame at a height appropriate for the autonomous device. The label might be of any suitable material, such as plastic or metal, and can be affixed to a wall, door-frame or other surface by means of an adhesive, a suction pad, a magnet, etc. According to the invention, the term 'visual' in 'visual indicator' is to be interpreted to mean that the user can see the visual indicator and can also see its orientation. The visual indicator is preferably simple in shape and design, for example it might have a round shape with a clearly defined arrow in the centre, and the background and arrow can be in colours of high contrast such as a red arrow on a white background.

In a preferred embodiment of the invention, the location of the private area relative to the visual indicator is defined by the orientation of the visual indicator. In the above example, the arrow on the visual indicator can be interpreted to mean that the private area is the area toward which the arrow points. Therefore, should the user position the visual indicator on a wall such that the arrow points to the right, this is to be interpreted that the private area is the area on the right of the visual indicator. As an alternative to an arrow, the visual indicator can be simply divided into two differently coloured regions, for example one half in green and the other half in red. The red half can mean 'private', since red is often associated with meanings such as 'stop' or 'no entry'. The green half would therefore be associated with the non-private or public area.

The orientation of the visual indicator can, according to the invention, be determined by the autonomous device using image analysis techniques applied to an image of the visual indicator. As indicated above, the autonomous device can have a camera or a number of cameras with which it captures images of its surroundings while navigating through a residence. These images can be detailed high-resolution images or video sequences, or just a simple low-resolution image. To facilitate quick recognition of a visual indicator, the autonomous device might avail of one or more models for the types of visual indicator that it is likely to encounter. Such a model might comprise sufficient descriptive information so that the autonomous device can easily identify the shape and orientation of the visual indicator using pattern recognition or object recognition techniques. A model might, for instance, be a description of an arrow pointing to the left in terms of edges and corner points. The autonomous device can perform image analysis to locate relevant points and/or edges in the images it generates. If a collection of points or edges in the image matches one of the models of an arrow, for instance, the autonomous device can conclude that it is 'seeing' a visual indicator at a boundary, and the location of the private area with respect to the visual indicator is given by the actual model identified, whether it is a model of an arrow 'pointing to the left' or one 'pointing to the right'. For this type of image analysis and model recognition, simple low-resolution grey-scale images can be sufficient. Alternatively, when a visual indicator with two different colour regions is used to demarcate a private from a non-private area, the corresponding model might simply describe the outline shape of the visual indicator and how the colours are to be interpreted. The autonomous device might then use colour images to identify the shape of the visual indicator and the location in the visual indicator of the colours.

However, image analysis is to a certain extent a time-intensive operation, requiring complex algorithms. Furthermore, the quality or success of image analysis depends to a large extent on the quality of the lighting. For example, the autonomous device may not 'see' the visual indicator in the dark or under poor lighting. Also, in order for a visual indicator to be reliably detected by the autonomous device by image analysis alone, the autonomous device must continually 'scan' its surroundings so that it can be sure of detecting any visual indicators placed in the residence, particularly since the locations of these visual indicators can by changed by the user(s) at any time. This might interfere with the tasks that are actually to be carried out by the autonomous device, causing delays. Furthermore, visual indicators must be placed at the correct height for the autonomous device to be able to 'see' them, particularly if the cameras of the autonomous device cannot be moved freely. If the user inadvertently places a visual indicator too high or too low, it may be that the autonomous device will not detect it. Another drawback of a reliance on image processing is that, if recording of video data is restricted in the private area, the autonomous device may no longer be able to detect the visual indicator when it once again leaves the private area.

Therefore, in a preferred embodiment of the invention, the autonomous device electronically detects the visual indicator. For example, the visual indicator might contain an inductive loop to generate a signal in a suitable counterpart incorporated in the autonomous device when the autonomous device passes the visual indicator. The success of the detection of the visual indicator might depend to some extent on the orientation of the autonomous device with respect to the visual indicator. In a particularly preferred embodiment of the invention, therefore, the location of the private area relative to the visual indicator is defined by at least two electronically detectable components incorporated in the visual indicator. For example, these components might be radio-frequency identification (RFID) tags with distinct frequencies. Since RFID tags are very flat, these can easily be incorporated into a visual indicator of the type described above. The autonomous device is preferably equipped with a suitable detector to pick up the signals emitted by the tags. Then, the orientation of the visual indicator can be determined by the autonomous device using signal processing techniques, for example by performing frequency analysis on the detected radio frequency signals to determine the retention period between the two signals emitted by the RFID tags. For example, an RFID tag located under the tip of the arrow or under the red half of the visual indicator—to use the examples described above—can have a higher frequency than an RFID tag located under the shaft of the arrow or under the green half of the visual indicator. In a particularly preferred embodiment of the invention, this difference in frequency is interpreted by the autonomous device to give the direction in which the private area is found.

Preferably, the visual indicator comprises information about the type of restriction that is to be applied in its collecting of ambient data. For example, in a conference room, it may be desirable that the autonomous device does not record any possibly confidential audio data, whereas video recordings would be of little importance. To this end, the visual indicator might show certain symbols or colours that are recognizable to a user and that can be interpreted by the autonomous device. For example, a symbol of an ear in a red circle with strikethrough—in the usual manner of a road sign prohibiting something—can indicate that the autonomous device is to disable audio recordings while in the relevant room. An additional symbol can indicate that video recordings are to be disabled, for example in a private room of a home. Another type of symbol might indicate that the autonomous device is not to make noise in this room, which may well be desirable in conference rooms of an office. Furthermore, any such additional information can also be detected by the autonomous device in an electronic manner. Information may be encoded in a signal transmitted by the visual indicator, for example by being preferably programmed in the RFID tag.

The autonomous device might be able to generate or compile a 'map' of the residence in which it moves, so that it 'knows' which room is designated as private. Such a map would assist the autonomous device particularly in the case of rooms that have more than one door. Furthermore, when an autonomous device has detected a visual indicator when entering a room, it may specifically look for this indicator upon leaving the room again. If it 'sees' that the visual indicator is no longer there, the autonomous device can react accordingly.

Evidently, it may not be satisfactory for the user to assume that the autonomous device has identified and correctly interpreted a visual indicator. Without some kind of feedback, the user may be uncertain whether the autonomous device is still recording and transmitting data to the external device while in the private area. Therefore, in a particularly preferred embodiment of the invention, the visual indicator can comprise a means of detecting when the autonomous device passes by, crossing the boundary from 'non-private' into 'private'. Such a detecting means can be a receiver to pick up a signal emitted by a suitable RFID tag on or in the autonomous device. When the autonomous device crosses the boundary, this event can be detected by the visual indicator and reported to the external device. For example, a transmitter of suitable range can be embedded in the visual indicator, and this transmitter can send a signal to the external device whenever an autonomous device passes by.

An acknowledgement of the boundary is also preferably reported by the autonomous device when the autonomous device detects and interprets a visual indicator. This acknowledgement can be sent by the autonomous device to the external device to which it also transmits its recorded ambient data, but this need not necessarily be so. Such an acknowledgement could also be sent to a different, dedicated device. However, for the sake of simplicity, it is assumed in the following that the external device manages the acknowledgment signal and the boundary crossing signal from the visual indicator. In this way, the external device is informed that the autonomous device is, for example, moving into a 'private' area. Such an acknowledgement can also be generated for the benefit of the user, for example the autonomous device can emit an audible 'beep' when it recognizes a visual indicator and that it is moving into a private area. If, however, the autonomous device fails to recognize the visual indicator, it follows that the autonomous device will not send any acknowledgement to the external device. However, the external device will already have been informed by the visual indicator that an autonomous device has crossed the boundary. In such a situation, the user should be informed so that he can take appropriate action in good time. Therefore, in a further preferred embodiment, an alarm such as an audible or visible signal is generated for the user by the external device whenever an autonomous device has failed to acknowledge a private area.

The user can then decide how to react, for example with a verbal command to the autonomous device to leave the private area.

Other objects and features of the present invention will become apparent from the following detailed descriptions considered in conjunction with the accompanying drawings. It is to be understood, however, that the drawings are designed solely for the purposes of illustration and not as a definition of the limits of the invention.

DETAILED DESCRIPTION OF EMBODIMENTS

Figure 1:
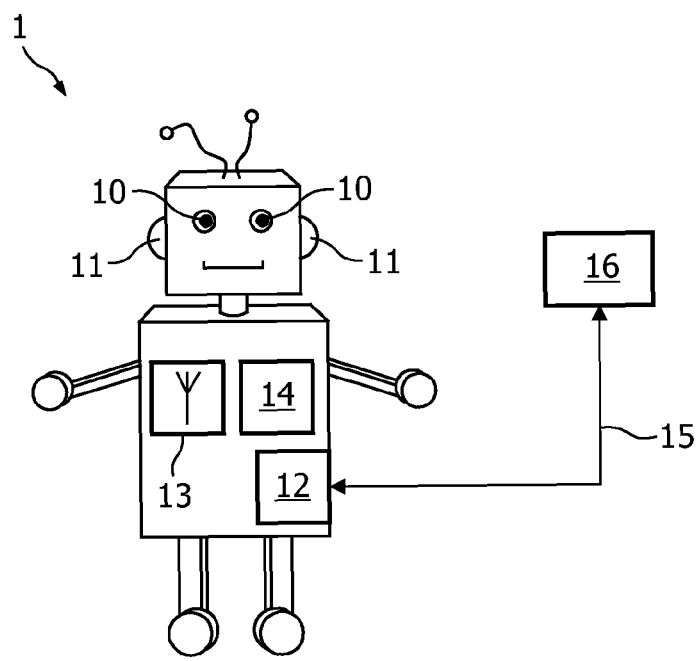
FIG. 1 shows an autonomous device according to an embodiment of the invention.

In the drawings, like numbers refer to like objects throughout. Objects in the diagrams are not necessarily drawn to scale.

FIG. 1 shows an embodiment of an autonomous device 1 according to the invention, realized in the form of a 'robot' with a humanoid appearance. This type of autonomous device 1 can be, for instance, used in a domestic environment to carry out certain tasks such as cleaning. To 'see' where it is going, the autonomous device 1 is equipped with cameras 10, which in this case are realized to look like 'eyes' in the 'head' of the device 1. It can also 'hear' by means of microphones 11 that look like 'ears'. Images of its surroundings and sounds are collected and recorded by the autonomous device 1. Some or all of this recorded ambient data is transmitted as an appropriate signal 15 to an external device 16 such as a personal computer 16 with more processing power for analyzing or processing the ambient data. In the diagram, the recorded ambient data 15 is indicated by a wired signal 15 to the external device 16, but will generally be transmitted wirelessly, for example over WLAN. To this end, the autonomous device 1 has a transceiver interface 12 for transmitting data to the external device 16 and for receiving information from the external device 16. In this embodiment, the autonomous device 1 also avails of a radio-frequency receiver 13 for picking up radio frequency signals from RFID tags. To identify itself in a similar manner, the autonomous device 1 of this embodiment also has such an RFID tag 14 incorporated in or on its housing.

Figure 2:
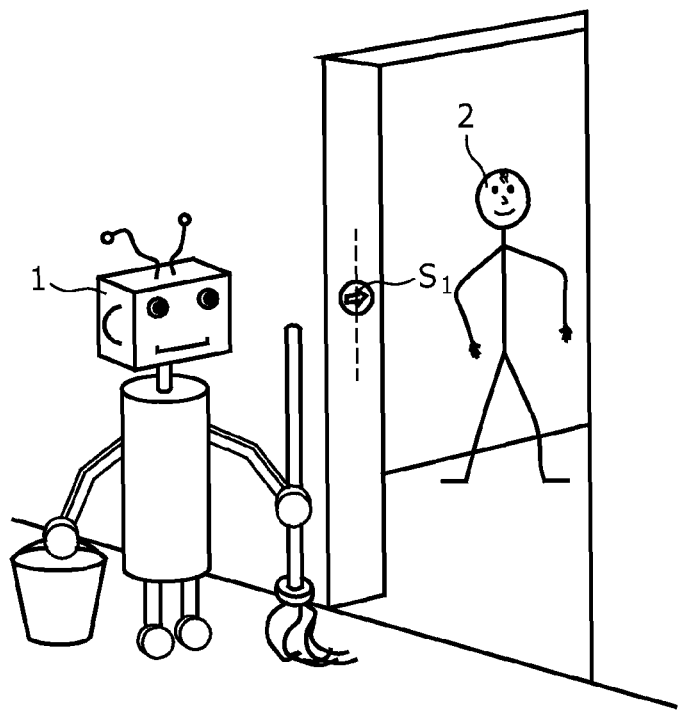
FIG. 2 shows an autonomous device at a boundary between a private and a non-private area.

A user of the autonomous device 1 knows that the autonomous device 1 can record images and sounds from its surroundings, and that these will be transmitted to the external device 16. In a private environment, this may be unacceptable to the user. To indicate to the autonomous device 1 that recording or transmission of such data is to be restricted in a private area, as shown in FIG. 2, the user 2 positions a visual indicator $S_1$ in such a way that it can be 'seen' or otherwise detected by the autonomous device 1, which will recognize a virtual boundary between a private area and a non-private area, as indicated by the dashed line in the diagram. As will explained in more detail below, visible markings on the visual indicator $S_1$ allow the user to correctly position the visual indicator $S_1$. In this example, the room in which the user is standing is designated as a 'private' area, and any area outside of this is 'non-private'. Since the autonomous device 1 has been previously programmed or configured to restrict or interrupt collection or transmission of data as long as it is in an area designated as 'private', the privacy of the user 2 is ensured in the private area P.

Figure 3A:
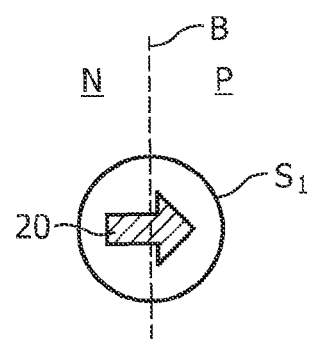
FIGS. 3a-3d show a number of embodiments of a visual indicator according to the invention.

FIGS. 3a-3d show a number of possible realizations of such a visual indicator, or sign. In FIG. 3a, the sign $S_1$ is shown in its simplest form, i.e. a label with an arrow 20 that can be clearly seen by the user and easily detected by an autonomous device using imaging techniques. The visual indicator $S_1$, or sign, can be attached to a door frame or on a wall, preferably at a height suitable for detection by an autonomous device, by any suitable means such as a suction pad, adhesive, Velcro®, etc. In this example, the direction in which the arrow points indicates the private area P. The opposite direction is by default non-private N. A virtual boundary B can be imagined to run as an invisible vertical line through the middle of the visual indicator $S_1$. The autonomous device, when passing the sign $S_1$, can conclude that the area pointed at by the arrow is a private area P, and will accordingly suppress or inhibit any transfer of video or audio data to the host computer.

Figure 3B:
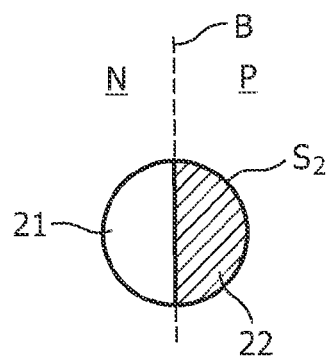

FIG. 3b shows a further embodiment of a visual indicator $S_2$, in this case comprising two coloured regions 21, 22, for example a green area 21 on the left and red 22 on the right. The different coloured regions 21, 22 are indicated in the diagram by different shadings. Here, the colour 'red', which intuitively means 'stop', is used to indicate that side of the visual indicator $S_2$ on which the private area P is found. By default, the non-private area N is on the other side of the visual indicator $S_2$.

Figure 3C:
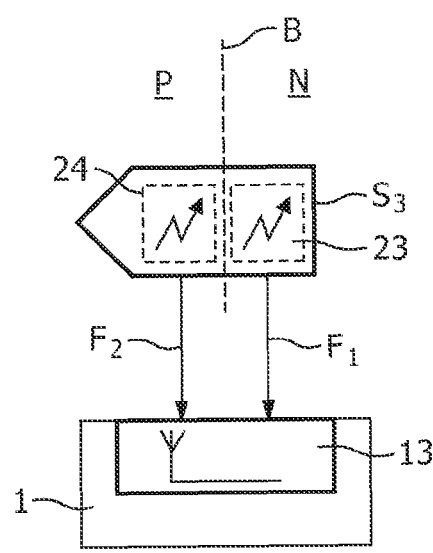

The visual indicator $S_3$ shown in FIG. 3c provides directional information optically to the user and to the autonomous device, and can also be electronically detected by an autonomous device. In this embodiment, the sign $S_3$ is shaped like an arrow, and the tip of the arrow indicates the private area P. By default, the opposite side of the sign $S_3$ indicates the non-private area N. A virtual boundary B can be imagined to pass through the middle of the sign $S_3$, which also comprises two RFID tags 23, 24 that transmit signals $F_1$, $F_2$ at two distinct frequencies. The interpretation of the two frequencies is predefined, for example the higher frequency can be associated with the private area P, while the lower frequency is associated with the non-private area N. The signals $F_1$, $F_2$ emitted by the RFID tags 23, 24 respectively are picked up by the autonomous device 1 using a suitable receiver 13. The signals are analyzed in an appropriate unit, not shown in the diagram, to quickly and accurately determine the location of the private area P relative to the RFID tags 23, 24 without having to perform any image analysis of the sign $S_3$. This type of sign is therefore suitable for use with autonomous devices that only avail of a rudimentary image analysis capability, or for autonomous devices that do not have cameras at all.

Figure 3D:
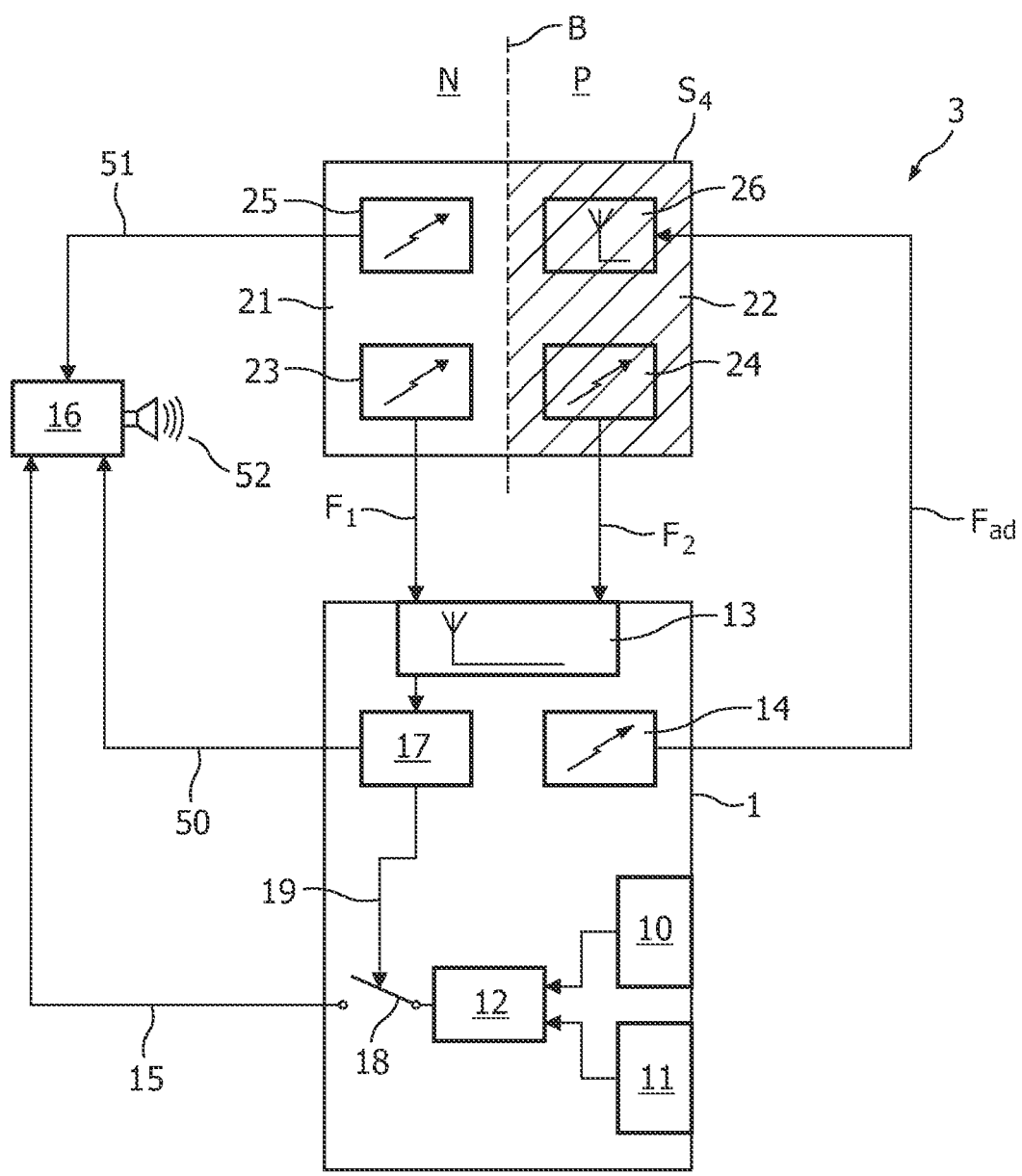

An additional level of security is provided by the visual indicator $S_4$ as part of a system 3 for controlling an autonomous device, as shown in FIG. 3d. This visual indicator embodiment works in conjunction with an RFID tag 14 attached to or incorporated in the autonomous device 1, indicated schematically in the diagram. Both the autonomous device 1 and the visual indicator $S_4$ have access to a host computer 16, for example over a wireless network. When the autonomous device 1 passes the sign $S_4$, it detects signals $F_1$, $F_2$ emitted by RFID tags 23, 24 incorporated in the sign $S_4$ by means of a receiver 13 as described under FIG. 3c above. The autonomous device 1 analyses these signals in an interpretation unit 17 to determine the relative locations of the private and non-private areas P, N. If the interpretation unit 17 concludes that the autonomous device 1 is passing into the private area or leaving the private area, the autonomous device 1 should acknowledge this event by transmitting a suitable signal 50 to the external device 16, and disable the transmission of any ambient data 15 to the external device 16. This is indicated in the diagram by a simplified control unit 18 in the form of a switch 18. When the switch 18 is open, ambient data collected and recorded by the cameras 10 and microphones 11 of the autonomous device 1 are not transmitted to the external device 16. As already mentioned above, the recipient of the acknowledgement signal 50 need not necessarily be the same as the external device 16 which is the recipient of any transmitted recorded ambient data. For the sake of simplicity, a common device 16 is shown in the diagram. Also for the sake of clarity, the components used to collect and record ambient data, such as cameras, microphones etc., are not shown in the diagram.

The visual indicator $S_4$ also detects the passing of the autonomous device 1 by means of a detector 26 that can pick up a radio frequency signal $F_{ad}$ emitted by the RFID tag 14 of the autonomous device 1, and can report this event as a boundary crossing signal 51 to the host computer 16 by means of a sender 25. In the event that the autonomous device 1 has not confirmed recognition of the sign $S_4$, the host computer 16 can undertake to rectify the situation by, for example, issuing an appropriate command to the autonomous device 1, or by alarming the user with an audible signal 52.

Figure 4:
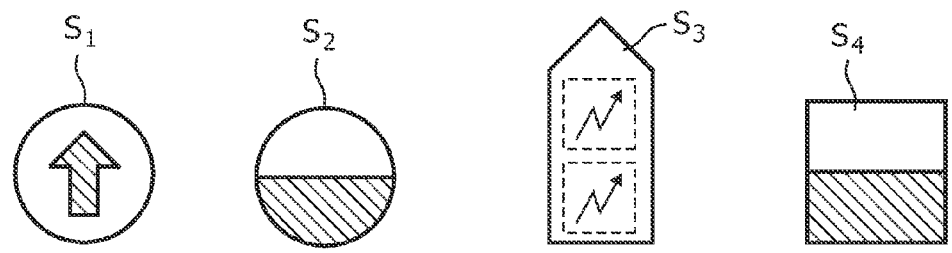
FIG. 4 shows the visual indicators of FIGS. 3a-3d positioned neutrally.

When the user does not require privacy, he can remove the visual indicator $S_1$, $S_2$, $S_3$, $S_4$ from its position on the wall or door-frame, or he might simply rotate the visual indicator $S_1$, $S_2$, $S_3$, $S_4$ to a neutral position so that the region indicating 'private' points up towards the ceiling or down towards the floor, as shown in FIG. 4. When the autonomous device 'sees' the sign $S_1$, $S_2$, $S_3$, $S_4$ in a neutral position, it can conclude that the user has no particular wish for privacy, and will transmit data to the external device as usual. Alternatively, the user could place the visual indicator $S_1$, $S_2$, $S_3$, $S_4$ higher up on the wall so that it is undetected by the autonomous device 1.

Figure 5:
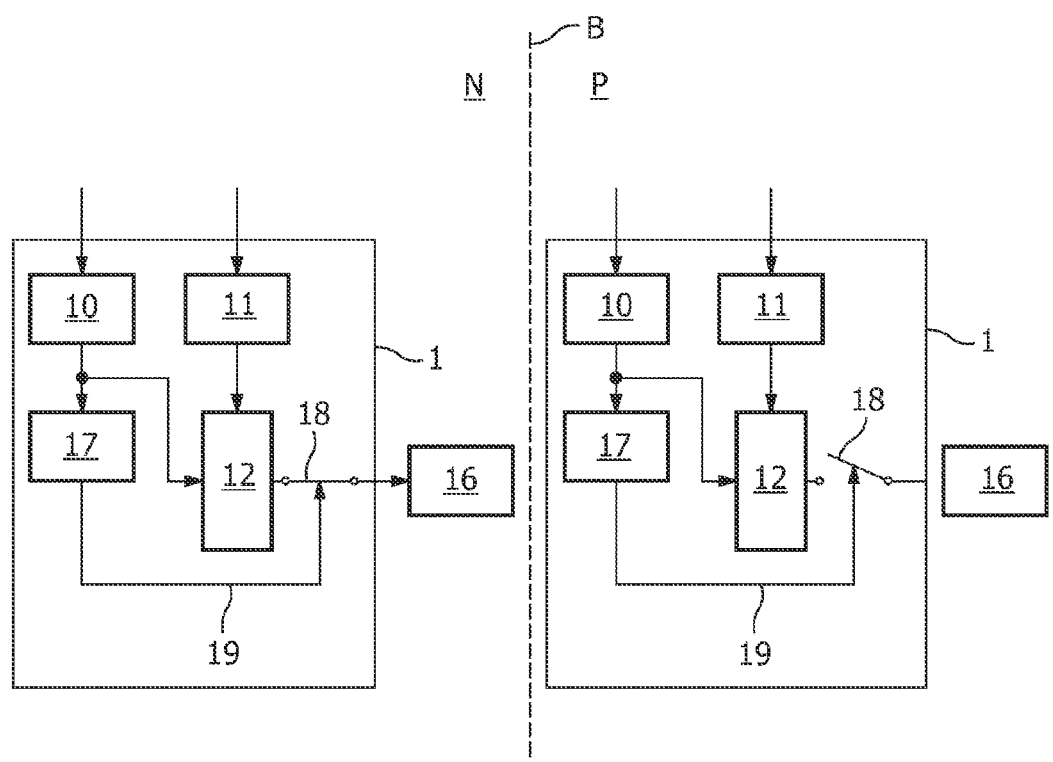
FIG. 5 shows a block diagram of an autonomous device according to an embodiment of the invention in a non-private area and in a private area.

FIG. 5 shows a block diagram of an autonomous device 1, indicating its behaviour in a non-private area N and in a private area P. Only the relevant components are shown, for the sake of clarity. On the left-hand side of the diagram, the autonomous device 1 is in a non-private area, and any data collected by sensors 10, 11, such as the cameras 10 and microphones 11 described in FIG. 1, are transmitted using the transmitter interface 12 of the autonomous device 1 to an external device 16, which can process the ambient data 15 to determine, for example, any actions that must be taken by the autonomous device 1 in response to a spoken command. Since the autonomous device 1 'knows' it is in a non-private area N, its interpretation unit 17 issues appropriate control signals 19 to allow the recorded ambient data to pass the switch 18 and be sent to the external device 16. In this embodiment, any images captured by the camera 10 are analyzed in an interpretation unit 17 to determine whether the autonomous device 1 is 'looking at' a visual indicator. The interpretation unit 17 detects the presence of a visual indicator (not shown in the diagram), and deduces that the autonomous device 1 is crossing a boundary B, so that it is now in a private area P, as shown on the right-hand side of the diagram. As a result, the interpretation unit issues a control signal 19 to the switch 18 to effectively open the switch, preventing recorded video and audio data from being transmitted to the external device 16.

Although the present invention has been disclosed in the form of preferred embodiments and variations thereon, it will be understood that numerous additional modifications and variations could be made thereto without departing from the scope of the invention. For example, the autonomous device might provide the user with a visible confirmation that it is no longer recording ambient data. It might be equipped with a light-emitting diode (LED), for instance, that lights up when the autonomous device passes a visual indicator placed at a boundary and has concluded that it is in a private area. For the sake of clarity, it is also to be understood that the use of "a" or "an" throughout this application does not exclude a plurality, and "comprising" does not exclude other steps or elements. Also, a "unit" or "module" may comprise a number of blocks or devices, unless explicitly described as a single entity.

The invention claimed is:

1. A method of controlling an autonomous device that records ambient data and transmits the recorded ambient data, said method comprising:
   positioning an indicator ($S_1$, $S_2$, $S_3$, $S_4$) at a boundary (B) between a private area (P) and a non-private area (N) to optically distinguish the private area (P) from the non-private area (N) for a user of the autonomous device, wherein the indicator comprises a visual sign, that can be visually understood by a user, to demarcate an area on one side of the indicator as private and an area on the other side of the indicator as non-private, and wherein the boundary comprises an imaginary vertical line through the indicator between the one side and the other side;
   detection of the indicator ($S_1$, $S_2$, $S_3$, $S_4$) by the autonomous device;
   interpretation of the indicator ($S_1$, $S_2$, $S_3$, $S_4$) by the autonomous device to determine whether the autonomous device is in a private area (P) or a non-private area (N); and
   restricting a recording or transmission of ambient data, in response to determining via the interpretation by the autonomous device that the autonomous device is in the private area, while the autonomous device is within the private area (P).

2. The method according to claim 1, wherein a location of the private area (P) relative to the indicator ($S_1$, $S_2$, $S_3$, $S_4$) is defined by an orientation of the indicator ($S_1$, $S_2$, $S_3$, $S_4$).

3. The method according to claim 2, wherein the orientation of the indicator ($S_1$, $S_2$) is determined by the autonomous device using image analysis techniques applied to an image of the indicator ($S_1$, $S_2$).

4. The method according to claim 1, wherein the indicator ($S_3$, $S_4$) is detected electronically by the autonomous device.

5. The method according to claim 4, wherein a location of the private area (P) relative to the indicator ($S_3$, $S_4$) is defined by characteristics of at least two electronically detectable components incorporated in the indicator ($S_3$, $S_4$).

6. The method according to claim 4, wherein an orientation of the indicator ($S_3$, $S_4$) is determined by the autonomous device using signal processing techniques on signals emitted by electronically detectable components of the indicator ($S_3$, $S_4$).

7. The method according to claim 1, wherein a crossing of the boundary (B) by the autonomous device is detected by a detector of the indicator ($S_4$) and reported to an external device.

8. The method according to claim 1, wherein an acknowledgement of the boundary (B) is reported by the autonomous device to an external device upon detection of the indicator ($S_1$, $S_2$, $S_3$, $S_4$) by the autonomous device.

9. A method of controlling an autonomous device that records ambient data and transmits the recorded ambient data, said method comprising:
- positioning an indicator ($S_1, S_2, S_3, S_4$) at a boundary (B) between a private area (P) and a non-private area (N) to optically distinguish the private area (P) from the non-private area (N) for a user of the autonomous device;
- detection of the indicator ($S_1, S_2, S_3, S_4$) by the autonomous device;
- interpretation of the indicator ($S_1, S_2, S_3, S_4$) by the autonomous device to determine whether the autonomous device is in a private area (P) or a non-private area (N); and
- restricting a recording or transmission of ambient data while the autonomous device is within the private area (P), wherein a crossing of the boundary (B) by the autonomous device is detected b a detector of the indicator ($S_4$) and resorted to an external device, and wherein an alarm is generated by the external device when the detector of the indicator ($S_4$) reports a crossing of the boundary (B) by the autonomous device and the autonomous device does not report an acknowledgement of the boundary (B) to the external device.

10. A system for controlling an autonomous device that records ambient data and transmits the recorded ambient data, said system comprising:
- a indicator ($S_1, S_2, S_3, S_4$) for positioning at a boundary (B) between a private area (P) and a non-private area (N) to optically distinguish the private area (P) from the non-private area (N) for a user of the autonomous device, wherein the indicator comprises a visual sign, that can be visually understood by a user, to demarcate an area on one side of the indicator as private and an area on the other side of the indicator as non-private, and wherein the boundary comprises an imaginary vertical line through the indicator between the one side and the other side;
- a detector for detection of the indicator ($S_1, S_2, S_3, S_4$) by the autonomous device;
- ah interpretation unit for interpretation of the indicator ($S_1, S_2, S_3, S_4$) by the autonomous device to determine whether the autonomous device is in a private area (P) or a non-private area (N); and
- a control unit for restricting a recording or transmission of ambient data, in response to determining via the interpretation unit by the autonomous device that the autonomous device is in the private area, while the autonomous device is within the private area (P).

11. An autonomous device comprising:
- a recording means for recording audio and/or video data;
- a transmitter for transmitting recorded data to an external device;
- a detector for detection of an indicator ($S_1, S_2, S_3, S_4$) positioned at a boundary (B) between a private area (P) and a non-private area (N), which indicator ($S_1, S_2, S_3, S_4$) optically distinguishes the private area (P) from the non-private area (N) for a user of the autonomous device, wherein the indicator comprises a visual sign, that can be visually understood by a user, to demarcate an area on one side of the indicator as private and an area on the other side of the indicator as non-private, and wherein the boundary comprises an imaginary vertical line through the indicator between the one side and the other side;
- an interpretation unit for interpretation of the indicator ($S_1, S_2, S_3, S_4$) to determine whether the autonomous device is in a private area (P) or a non-private area (N); and
- a control unit for restricting a recording or transmission of ambient data, in response to determining via the interpretation unit that the autonomous device is in the private area, while the autonomous device is within the private area (P).

12. An indicator ($S_3, S_4$) for placement at a boundary between a private area (P) and a non-private area (N), to optically distinguish the private area (P) from the non-private area (N) for a user, which indicator ($S_3, S_4$) comprises a number of electronically detectable components, wherein the indicator comprises a visual skin, that can be visually understood by a user, to demarcate an area on one side of the indicator as private and an area on the other side of the indicator as non-private, and wherein the boundary comprises an imaginary vertical line through the indicator between the one side and the other side, and wherein the indicator is configured for use in a system for controlling an autonomous device that records ambient data and transmits the recorded ambient data, wherein the system comprises:
- a detector for detection of the indicator ($S_1, S_2, S_3, S_4$) by the autonomous device;
- an interpretation unit for interpretation of the indicator ($S_1, S_2, S_2, S_4$) by the autonomous device to determine whether the autonomous device is in a private area (P) or a non-private area (N); and
- a control unit for restricting a recording or transmission of ambient data, in response to determining via the interpretation unit by the autonomous device that the autonomous device is in the private area, while the autonomous device is within the private area (P).

* * * * *